United States Patent Office 3,455,875
Patented July 15, 1969

3,455,875
STABILIZED POLYOLEFIN COMPOSITION
Otto Mauz, Niederhofheim, Taunus, and Eberhard Prinz, Frankfurt am Main, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 151,422, Nov. 10, 1961. This application June 13, 1966, Ser. No. 556,886
Int. Cl. C08f 45/58
U.S. Cl. 260—45.85     11 Claims

ABSTRACT OF THE DISCLOSURE

Polyolefins stabilized with esters or amides of diphenolic acid.

---

This application is a continuation in-part-application of our copending application Ser. No. 151,422, filed on Nov. 10, 1961, now abandoned.

The invention relates to a polyolefin composition which has incorporated therewith a stabilizing compound which stabilizes the polymer against degradation during subsequent processing.

The Ziegler-type low pressure polyolefins of high molecular weight which constitute valuable plastics having interesting properties are increasingly used in the industry. Some of these high polymers are prepared from α-olefins of the general formula $CH_2=CH.R$ in which R represents hydrogen or a branched or unbranched aliphatic radical having up to 12 carbon atoms. The monomers used for making the above polyolefins include, for example, ethylene, propylene, butene-(1), hexene-1,4-methylpentene-(1), 5.5-dimethylhexene-(1). The high polymers obtained from α-olefins are processed at high temperatures due to their high melting points or ranges. Such processing involves degradation of the high molecular chains, especially within the presence of air. Degradation, however, impairs the technological properties of shaped articles prepared from such polyolefins, such as strength, rigidity and flexibility. Numerous investigations have been made to determine such degradation, and the results obtained reported in the pertinent literature. It is supposed that the degradation commences at the "weak" positions in the molecule of the polymer. These "weak" or "sensitive" positions in the macromolecule include double bonds, vinyl or vinylidene groups or tertiary or quarternary carbon atoms. Degradation presumably occurs via oxidation products, for example hydroperoxides, which are formed by the polymer under the action of atmospheric oxygen at high temperature or in the presence of luminous rays rich in energy, especially ultraviolet light.

Numerous stabilizers have been proposed to avoid such degradation. According to U.S. Patent 2,434,662 there are used as stabilizers derivatives, such as diphenylol propane and dicresylol propane. U.S. Patent 2,538,355 describes similar methane derivatives which carry alkyl groups at the benzene nucleus, and Canadian Patent 470,325 describes condensation products of phenol and cyclohexane as agents active for the stabilization of high-pressure polyethylenes. These compounds can, however, only be used for stabilizing high-pressure polyethylene but they are inactive in low pressure type polyolefins.

We have now found that polyolefins containing tertiary carbon atoms, especially those which due to their relatively large content of tertiary carbon atoms are particularly sensitive to oxidation, e.g. polypropylene, can be stabilized against degradation during processing by incorporating therewith 0.05 to 5% by weight, calculated on the polyolefin, of a compound of the general Formula 1 or 2 indicated below, if desired, in combination with other compounds known as stabilizers for polyolefins.

The object of the invention is therefore a composition of matter comprising a polyolefin of the group consisting of polypropylene, polybutene and polyethylene and 0.05 to 5% by weight, calculated on the polyolefin, of a compound of Formula 1

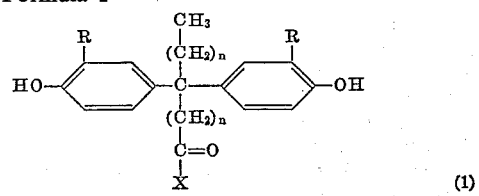

(1)

or Formula 2

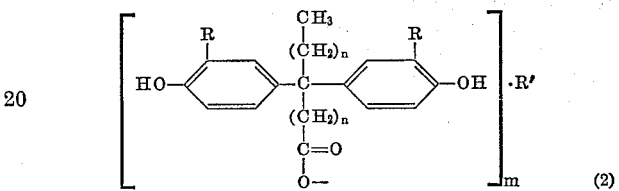

(2)

wherein R is hydrogen or a saturated aliphatic hydrocarbon radical having 1 to 18 carbon atoms, in particular methyl, ethyl, propyl, tertiary butyl, isooctyl, isononyl, n-dodecyl, isododecyl, or n-octadecyl; n is a whole number from zero to 8; X is a radical selected from an alkoxy group having 1 to 34 carbon atoms, an amino group the hydrogen atoms of which may be substituted by methyl, ethyl, propyl, butyl, dodecyl, or octadecyl; R' is an α,ω-bivalent hydrocarbon radical selected from methylene, ethylene, propylene, butylene, pentylene, hexylene, heptylene, octylene, nonylene, decylene, undecylene, dodecylene, tetradecylene, hexadecylene and octadecylene or a polyvalent radical selected from the following structures

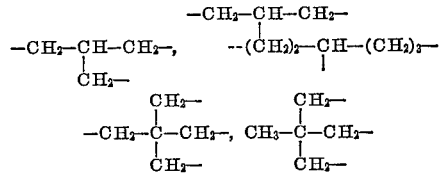

and

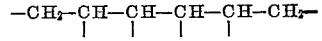

which polyvalent radical may contain at least one hydroxy group; and m is a whole number from 2 to 6.

The alkoxy groups X in the aforementioned compounds of Formula 1 may be formed from alcohols used for esterification, preferably methyl, ethyl, propyl, butyl, tertiary butyl, amyl, octyl, nonyl, dodecyl or octadecyl alcohol; X, therefore, represents an alkoxy group, preferably the methoxy, ethoxy, propoxy, butoxy, tertiary butoxy, ocatoxy, dodecyloxy or octadecyloxy group; X also represents an amino group the hydrogen atoms of which may be wholly or partially substituted by methyl, ethyl, propyl, butyl, dodecyl or octadecyl; R' in Formula 2 may also be formed from the corresponding alcohols by means of esterification. $R_2$ is substituted m times (m=2 to 6)

by means of the radical written in brackets in the formula.

As disclosed in "Johnson's Wax" DPA Series Bulletin No. 7, Feb. 12, 1959, "Diphenolic Acid" (4,4-bis-(hydroxy-phenyl)-pentanoic acid) has eight reactive sites including the positions designated in the formulae of the compounds used as stabilizers according to the invention as "R" and "X," namely the "H" ortho to the phenolic OH and the "OH" of the carboxyl group. "Diphenolic Acid" described in the bulletin is proposed among others for use as an additive for polymers.

In "Technical Date Diphenolic Acid"—S. C. Johnson & Sons, Feb. 17, 1959, is mentioned that "Diphenolic Acid" can be used as antioxidant and ultraviolet stabilizer. The publication discloses also that the carboxyl group of "Diphenolic Acid" may be reacted to form "esters" and "amides." The publication "Technical Date Diphenolic Acid, A New Chemical Intermediate"—S. C. Johnson & Sons—April 1958, discloses that "Diphenolic Acid" is an intermediate for the synthesis of chemical compounds useful as additives for polymers. It is also mentioned therein that "Diphenolic Acid" can react to form the corresponding esters and amides.

However, there is no disclosure in the aforementioned three publications leading to the fact that the esters and amides of "Diphenolic Acid" are useful with excellent results as stabilizers in polyolefins. Furthermore it could not be concluded from the results obtained in experiments in which "Diphenolic Acid" was used as stabilizing component in polyolefins that the corresponding esters and amides would have such increasing stabilizing effects. "Diphenolic Acid" itself is a very poor stabilizer in polyolefinfis, whereas the esters and amides of this acid and of similar compounds either alone or in combination with other known stabilizing agents, for instance dialkyl disulfides and dialkyl esters or thiodipropionic acid in each of which the alkyl groups contains from 10 to 18 carbon atoms, produce excellent stabilizing effects. This could not be foreseen from the disclosure of the above-mentioned three publications.

The polyolefins that can be stabilized according to this invention include those which contain a small or larger number of tertiary carbon atoms but especially polypropylene and polybutene, which contain numerous tertiary carbon atoms due to the type of monomer used. It is evident that polyolefins such as high pressure polyethylene or low pressure polyethylene which due to side reactions during the polymerization process contain more or less, long or short side chains, can also be stabilized by this invention. Polypropylene, which is the preferred polyolefin to be stabilized according to the invention, can be prepared, for example, with the use of a Ziegler-type low-pressure polymerization catalyst described inter alia in "Polyethylene" by Raff-Allison (1956), pages 72–81. The other polyolefins, which can be stabilized according to the invention, can be prepared with the same Ziegler catalysts.

As stabilizing compounds according to the invention can be used for example: 4,4-bis-(4-hydroxy-phenyl)-pentanoic acid methylester, -n-butylester, -tertiary butylester, -octylester, -decylester, -dodecylester, -hexadecylester, octadecylester, -waxalcoholester (wax alcohol: 15% $C_{12}+C_{14}$, 70% $C_{16}+C_{18}$, 15% $C_{20}+C_{22}$), -tallow fat alcohol ester (tallow fat alcohol: 3–5% $C_{14}$, 27–32% $C_{16}$, 65–70% $C_{18}$); furthermore 3,3-bis-(4-hydroxy-3-methylphenyl)-butanoic acid methyl ester, -n-butyl ester, -tertiary butyl ester, -octyl ester, -decyl ester, -hexadecylester, -octadecylester, -waxalcoholester, -tallow fat alcohol ester; 3,3-bis-(4-hydroxy-3-tertiary butyl-phenyl)-butanoic acid dodecyl ester, 3,3-bis-(4-hydroxy-3-iso-octyl-phenyl)-butanoic acid butyl ester, 3,3-bis-(4-hydroxy-3-isononyl-phenyl)-butanoic acid propyl ester, 3,3-bis-(4-hydroxy-3-tertiary butyl-phenyl)-butanoic acid butyl ester, -dodecyl ester; 4,4-bis-(4-hydroxy-phenyl)-pentanoic acid ethylenglycol ester, -glycerin ester, -hexanetriol ester, -pentaerythritol ester, -trimethylolpropane ester. Other compounds useful for the invention are 4,4-bis-(4-hydroxy-phenyl)-pentanoic acid dodecylamide, 3,3-bis-(4-hydroxy-3-methylphenyl)-butanoic acid octylamide, - octadecylamide, 3,3-bis-(4-hydroxy-3-tertiary butyl-phenyl)-butanoic acid-N-methyl-N-octadecylamide.

The compounds used as stabilizers according to the invention when employed either alone or in combination with known antiaging substances give stabilizing effects far better than the known stabilizing compounds for polyolefins.

A preferred embodiment of the invention consists in the stabilization of a polyolefin selected from polyethylene, polypropylene and polybutene with 0.05 to 5% by weight, calculated on the polyolefin, of a compound of the Formula 1

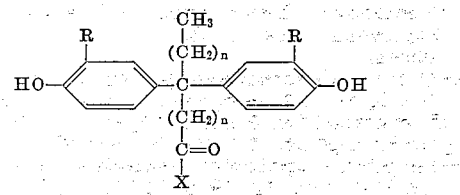

wherein R is hydrogen or a saturated aliphatic hydrocarbon radical having 1 to 18 carbon atoms, in particular, methyl, ethyl, propyl, tertiary butyl, isooctyl, isononyl, n-dodecyl, isododecyl, or n-octadtecyl; $n$ is a whole number from zero to 8, in particular zero to 1; and X is an alkoxy group having 8 to 18 carbon atoms.

The compounds used as stabilizers according to the invention can be prepared by condensing e.g. phenol, orthocresol, o-sec. propylphenol or o-tert. butylphenol with a keto-acid or its ester in the presence of an acid as a catalyst. The keto acids and their esters include especially pyroracemic acid, acetoacetic acid ethylester, butane-on-(3)-carboxylic acid.

The bis-(4-hydroxyphenyl)-alkanoic acids or bis-(4-hydroxyalkylphenyl)-alkanoic acids so obtained may be esterified in known manner (Journal Organic Chemistry 23, 1004–1006 (1958)).

The stabilizer compound is advantageously incorporated into the polyolefin to be stabilized by mixing a large proportion of stabilizer with a small proportion of polyolefin. Preferably, a concentrated solution of the stabilizer in a low-boiling solvent, for example acetone or methylene chloride, is mixed with a small amount of pulverulent polymer to be stabilized, the components being used in a proportion such that after evaporation of the solvent the resulting mixture contains about 30–40% by weight of the stabilizer compound.

In this manner, a dry powder is obtained which can be incorporated as usual into the polymer to be stabilized by mixing to obtain the desired concentration of stabilizer in the finished composition. It is obvious that the stabilizer can also be incorporated during the manufacturing process of the polymer or at a later processing stage. This involves the special advantage that the polymer is protected at an early stage, i.e. during the manufacturing or processing steps, against the influence of air and atmospheric oxygen, especially at high temperatures.

According to another embodiment of the invention, the stabilizer compound may be incorporated into the polyolefin to be stabilized in combination with other compounds known as stabilizers for polyolefins, e.g. an antiaging substance, for example di-(octadecyl)-disulfide or thio-dipropionic acid dilauryl ester, or in association with a processing auxiliary agent, for example calcium stearate.

The polyolefins stabilized according to the invention can be formed to shaped articles by conventional methods, which include press molding, injection molding and extrusion.

EXPERIMENTS

Tests were carried out under especially severe conditions using a polypropylene press plate particularly sensitive to oxygen as follows:

A 1% acetone solution of 4,4-bis-(4-hydroxyphenyl)-pentanoic acid dodecyl ester was mixed with powdered polypropylene in a ratio such that the stabilizer concentration was 0.5%, calculated on the polypropylene. The stabilized polypropylene powder was dried in vacuo at 50° C. and then press molded into round plates 1 mm. thick (diameter: 120 mm.) under the following conditions: temperature: 200° C.; contact pressure, 10 minutes: 5–10 atmospheres; molding pressure, 2 minutes at 100 atmospheres.

From each plate, several strips (10 mm. wide; 100 mm. long) were punched out, suspended freely in a drying cabinet and tempered at 140° C. with the admission of air. The heat stability was determined as the time until embrittlement occurred, i.e. the time in days after which the specimens broke when bent by 180° C. (Brittle time).

In the following Table 1 are listed a series of known stabilizers which have been tested in polypropylene. The table shows that 4,4-bis-(4-hydroxyphenyl)-pentanoic acid dodecyl ester, for example is 8 to 10 times more active than the known phenolic stabilizers.

It has also been found that polypropylene specimens which have been stabilized with 0.5% bis-(4-hydroxyphenyl)-pentanoic acid dodecylester and tempered at 140° C. for the same period of time exhibit a substantially lower reduction in their reduced specific viscosity and hence less degradation than comparative polypropylene specimens that have been stabilized with conventional phenolic antioxidants.

In the following table are listed the times until embrittlement at 140° C. for polypropylene specimens stabilized in each case with 0.5% of the stabilizers mentioned below:

TABLE 1

| Stabilizer | Stabilizer conc., percent by weight | Brittle time, days (140° C.) |
|---|---|---|
| (1) Bis-(4-hydroxy-3-methylphenyl)-dimethyl-methane [1] | 0.5 | 6 |
| (2) 4.4'-bis-(2-methyl-6-tert.butylphenol) [1] | 0.5 | 5 |
| (3) 4.4'-methylene-bis-(2.5-ditert. butyl-phenol) [1] | 0.5 | 7 |
| (4) 2.6-di-tert.butyl-p-cresol [1] | 0.5 | 1 |
| (5) 4.4'-methylene-bis-(5-i-nonylphenol) [1] | 0.5 | 6 |
| (6) 4.4-bis-(4-hydroxyphenyl)-pentanoic acid dodecylester | 0.5 | 51 |

[1] Comparative examples.

From the following Table 2 it can be seen that the stabilizing effect of 4.4-bis-(4-hydroxy-phenyl)-pentanoic acid ("Diphenolic Acid") is very poor while the corresponding esters are very good stabilizers. The results are obtained with polypropylene as polyolefin. The test specimens were obtained in similar manner like the specimens mentioned in Table 1.

TABLE 2

| Stabilizer | Stabilizer concentration percent by weight | Brittle time in days (140° C.) |
|---|---|---|
| (7) Polypropylen without stabilizer [1] | | 1 |
| (8) 4,4-bis-(4-hydroxy-phenyl)-pentanoic acid ("DPA") [1] | 0.5 | 4 |
| (9) "DPA"—octyl ester | 0.5 | 45 |
| (10) "DPA"—dodecyl ester | 0.5 | 51 |
| (11) "DPA"—octadecyl ester | 0.5 | 48 |
| (12) 3,3-bis-(4-hydroxy-3-methyl-phenyl)-butanoic acid octyl ester | 0.5 | 40 |
| (13) 3,3-bis-(4-hydroxy-3-methyl-phenyl)-butanoic acid decyl ester | 0.5 | 45 |
| (14) 3,3-bis-(4-hydroxy-3-methyl-phenyl)-butanoic acid hexadecyl ester | 0.5 | 47 |
| (15) 3,3-bis-(4-hydroxy-3-methyl-phenyl)-butanoic acid octadecyl ester | 0.5 | 41 |
| (16) 3,3-bis-(4-hydroxy-3-methyl-phenyl)-butanoic acid wax-alcohol ester [2] | 0.5 | 43 |
| (17) 3,3-bis-(4-hydroxy-3-methyl-phenyl)-butanoic acid tallow fat alcohol ester [3] | 0.5 | 40 |
| (18) 3,3-bis-(4-hydroxy-3-tert.-butyl-phenyl)-butanoic acid dodecyl ester | 0.5 | 49 |
| (19) 3,3-bis-(4-hydroxy-3-iso-octyl-phenyl)-butanoic acid butyl ester | 0.5 | 37 |
| (20) 3,3-bis-(4-hydroxy-3-iso-nonyl-phenyl)-butanoic acid propyl ester | 0.5 | 40 |

[1] Comparative examples.
[2] Wax alcohol: 15% $C_{12}+C_{14}$; 70% $C_{16}+C_{18}$; 15% $C_{20}+C_{22}$.
[3] Tallow fat alcohol: 3–5% $C_{14}$; 27–32% $C_{16}$; 65–70% $C_{18}$.

Table 3 shows the stabilizing effects obtained with combinations of the stabilizing compounds according to the invention with di-octadecyl-disulfide (a known antiaging compound). The tests were carried out with samples of polypropylene including 0.35% by weight, calculated on the polypropylene, of the stabilizer mixture (0.1% by weight of phenolic stabilizer compound according to the invention and 0.25% by weight of di-octadecyl-disulfide), prepared similar to the specimens mentioned in Table 1.

TABLE 3

Stabilizer combination:
(a) 0.1% by weight of phenolic stabilizer compound according to the invention.
(b) 0.25% by weight of di-octadecyl-disulfide.

| Phenolic stabilizer (a) | Stabilizer, conc. percent by weight (a) + (b) | Brittle time in days (140° C.) |
|---|---|---|
| (21) 3,3-bis-(4-hydroxy-3-methyl-phenyl)-butanoic acid methyl ester | 0.35 | 41 |
| (22) 3,3-bis (4-hydroxy-3-methyl-phenyl)-butanoic acid n-butyl ester | 0.35 | 45 |
| (23) 3,3-bis(4-hydroxy-3-methyl-phenyl)-butanoic acid tert. butyl ester | 0.35 | 43 |
| (24) 3,3-bis(4-hydroxy-3-methyl-phenyl)-butanoic acid octyl ester | 0.35 | 49 |
| (25) 3,3-bis-(4-hydroxy-3-methyl-phenyl)-butanoic acid octadecyl ester | 0.35 | 70 |
| (26) 3,3-bis-(4-hydroxy-3-methyl-phenyl)-butanoic acid wax alcohol ester | 0.35 | 47 |
| (27) 3,3-bis-(4-hydroxy 3-methyl-phenyl)-butanoic acid tallow fat alcohol ester | 0.35 | 43 |
| (28) 3,3-bis-(4-hydroxy-3-tert.butyl-phenyl)-butanoic acid n-butyl ester | 0.35 | 40 |
| (29) 3,3-bis (4-hydroxy-3-tert.butyl-phenyl)-butanoic acid dodecyl ester | 0.35 | 73 |

Table 4 shows the stabilizing effects obtained with combinations of the stabilizing compounds according to the invention with thiodipropionic acid dilauryl ester. The tests were carried out with specimens of polypropylene including 0.5% by weight of the stabilizer mixture (0.25% by weight of phenolic stabilizer compound according to the invention and 0.25% by weight of thiodipropionic acid dilauryl ester).

TABLE 4

Stabilizer combination:
(a) 0.25% by weight of phenolic stabilizer compound according to the invention.
(b) 0.25% by weight of thiodipropionic acid dilauryl ester.

| Phenolic stabilizer (a) | Stabilizer-conc. percent by weight (a) + (b) | Brittle time in days (140° C.) |
|---|---|---|
| (30) 4,4-bis-(4-hydroxy-phenyl)-pentanoic acid methyl ester | 0.5 | 44 |
| (31) 4,4-bis-(4-hydroxy-phenyl)-pentanoic acid n-butyl ester | 0.5 | 48 |
| (32) 4,4-bis-(4-hydroxy-phenyl)-pentanoic acid octyl ester | 0.5 | 52 |
| (33) 4,4-bis-(4-hydroxy-phenyl)-pentanoic acid dodecyl ester | 0.5 | 70 |
| (34) 4,4-bis-(4-hydroxy-phenyl)-pentanoic acid octadecyl ester | 0.5 | 56 |
| (35) 4,4-bis-(4-hydroxy-phenyl)-pentanoic acid ethylene glycol ester | 0.5 | 45 |
| (36) 4,4-bis-(4-hydroxy-phenyl)-pentanoic acid glycerol ester | 0.5 | 41 |
| (37) 4,4-bis-(4-hydroxy-phenyl)-pentanoic acid hexantriol ester | 0.5 | 47 |
| (38) 4,4-bis-(4-hydroxy-phenyl)-pentanoic acid pentaerythritol ester | 0.5 | 40 |
| (39) 4,4-bis-(4-hydroxy-phenyl)-pentanoic acid trimethylolpropan ester | 0.5 | 45 |

Table 5 shows the stabilizing effects obtained with combinations of the stabilizing compounds according to the invention with either thiodipropionic acid dilauryl ester or dioctadecyl disulfide. The tests were carried out with specimens of polypropylene including 0.5% by weight of the stabilizer mixture.

TABLE 5

| Stabilizer Mixture | Stabilizer conc. in percent by weight | Brittle time in days (140° C.) |
|---|---|---|
| (40) 4,4-bis-(4-hydroxy-phenyl)-pentanoic acid dodecyl amide | 0.25 | 35 |
| plus Thiodipropionic acid dilauryl ester | 0.25 | |
| (41) 3,3-bis-(4-hydroxy-3-methyl-phenyl)-butanoic acid octylamide | 0.25 | 32 |
| plus Thiodipropionic acid dilauryl ester | 0.25 | |
| (42) 3,3-bis-(4-hydroxy-3-methyl-phenyl)-butanoic acid octadecyl amide | 0.25 | 39 |
| plus Dioctadecyl disulfide | 0.25 | |
| (43) 3,3-bis-(4-hydroxy-3-tert-butyl-phenyl)-butanoic acid N-methyl-N-octadecyl-amide | 0.25 | 42 |
| plus Dioctadecyl disulfide | 0.25 | |

By esterifying "Diphenolic Acid" or the similar acids with high molecular weight, monohydric or especially dihydric or polyhydric alcohols, e.g. ethylene glycol, 1,4-butane diol, glycerol, trimethylolpropane, hexane triol, pentaerythritol, hexitol at one or more alcoholic OH-groups, stabilizers of high molecular weight, which are distinguished by their little pronounced volatility and good compatibility with the polyolefins, can readily be prepared.

The above-mentioned tables show clearly that the compounds used according to the invention as agents for stabilizing polyolefins compare very favorably with the conventional phenolic stabilizers. Moreover, the compounds used according to the invention involve the advantage that they are practically nonvolatile due to their relatively high molecular weight, which can be adjusted as desired, and that they have no tendency to exudation or blooming even at high temperature due to their good compatibility with the polyolefins.

We claim:
1. A composition of matter comprising a polyolefin of the group consisting of polypropylene, polybutene and polyethylene and 0.05 to 5% by weight, calculated on the polyolefin, of a compound of Formula 1

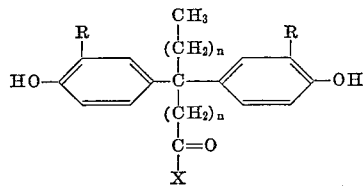

(1)

or Formula 2

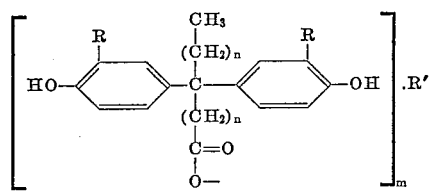

(2)

wherein R is hydrogen or a saturated aliphatic hydrocarbon radical having 1 to 18 carbon atoms; n is a whole number from zero to 8; X is a radical selected from an alkoxy group having 1 to 34 carbon atoms and an amino group the hydrogen atoms of which may be substituted by a member selected from methyl, ethyl, propyl, butyl, dodecyl, and octadecyl; R' is an α,ω-bivalent hydrocarbon radical selected from methylene, ethylene, propylene, butylene, pentylene, hexylene, heptylene, octylene, nonylene, decylene, undecylene, dodecylene, tetradecylene, hexadecylene and octadecylene or a polyvalent radical selected from the following structures

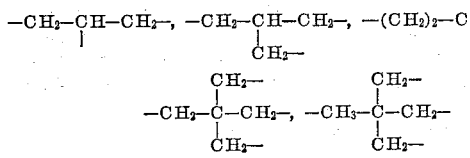

and

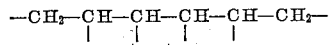

which polyvalent radical may contain at least one hydroxy group; and m is a whole number from 2 to 6.

2. Composition of matter according to claim 1 wherein the polyolefin is polypropylene.

3. Composition of matter according to claim 1 comprising additionally a dialkyl-disulfide having alkyl groups composed of 10-18 carbon atoms.

4. Composition of matter, according to claim 3 wherein n is zero or 1.

5. Composition of matter according to claim 3 wherein the polyolefin is polypropylene.

6. Composition of matter according to claim 1 comprising additionally a thiodipropionic acid dialkyl ester, having alkyl groups composed of 10 to 18 carbon atoms.

7. Composition of matter comprising a polyolefin selected from polyethylene, polypropylene and polybutylene, and 0.05 to 5% by weight, calculated on the polyolefin, of a compound of the formula

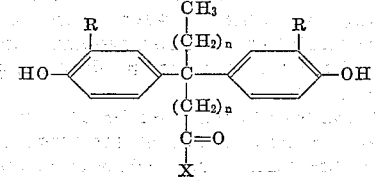

wherein R is selected from hydrogen, methyl, ethyl, propyl, tert.butyl, isooctyl, isononyl, n-dodecyl, isododecyl and n-octadecyl; n is a whole number from zero to 8; and X is an alkoxy group having 8 to 18 carbon atoms.

8. Composition of matter according to claim 7 comprising additionally a dialkyl disulfide having alkyl groups composed of 10–18 carbon atoms.

9. Composition of matter according to claim 7 comprising additionally a thiodipropionic acid dialkyl ester having alkyl groups composed of 10–18 carbon atoms.

10. A composition of matter comprising a polyolefin of the group consisting of polypropylene, polybutene and polyethylene and 0.05 to 5% by weight, calculated on the polyolefin, of a compound of the formula

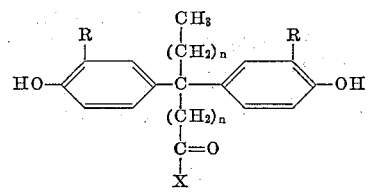

wherein R is hydrogen or a saturated aliphatic hydrocarbon radical having 1 to 18 carbon atoms; n is a whole number from zero to 8 and X is a radical selected from an alkoxy group having 1 to 34 carbon atoms and an amino group the hydrogen atoms of which may be substituted by a member selected from methyl, ethyl, propyl, butyl, dodecyl and octadecyl.

11. A composition of matter comprising a polyolefin of the group consisting of polypropylene, polybutene and polyethylene and 0.05 to 5% by weight, calculated on the polyolefin, of a compound of the formula

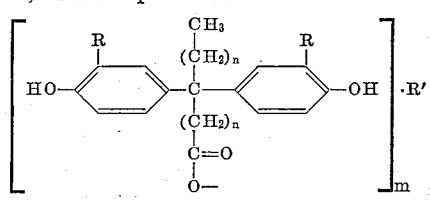

wherein R is hydrogen or a saturated aliphatic hydrocarbon radical having 1 to 18 carbon atoms; n is a whole number from zero to 8; R' is an α,ω-bivalent hydrocarbon radical selected from methylene, propylene, butylene, pentylene, hexylene, heptylene, octylene, nonylene, decylene, undecylene, dodecylene, tetradecylene, hexadecylene and octadecylene or a polyvalent radical selected from the following structures

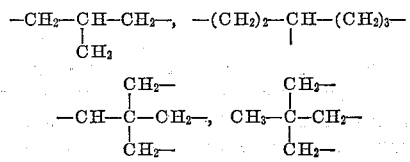

and

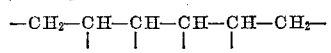

which polyvalent radical may contain at least one hydroxyl group; and $m$ is a whole number from 2 to 6.

References Cited

FOREIGN PATENTS 1,248,217  10/1960  France.

OTHER REFERENCES

"Technical Data Diphenolic Acid"—S. C. Johnson and Sons, Feb. 12, 1959, pp. 6 and 20–26.

"Technical Data Diphenolic Acid, a New Chemical Intermediate," S. C. Johnson and Sons, April 1958, pp. 2, 6 and 8.

"Johnson's Wax DPA Series Bulletin No. 1"—S. C. Johnson and Sons, Feb. 17, 1959, 1 page.

DONALD E. CZAJA, Primary Examiner

V. P. HOKE, Assistant Examiner

U.S. Cl. X.R.

260—45.9, 45.95, 45.8